No. 770,362. PATENTED SEPT. 20, 1904.
D. A. FRICK.
NUT LOCK.
APPLICATION FILED APR. 18, 1904.
NO MODEL.

WITNESSES:
David C. Walter
M. Marks.

INVENTOR:
David A. Frick

No. 770,362.  
Patented September 20, 1904.

UNITED STATES PATENT OFFICE.

DAVID A. FRICK, OF OTTAWA, OHIO.

NUT-LOCK.

SPECIFICATION forming part of Letters Patent No. 770,362, dated September 20, 1904.

Application filed April 18, 1904. Serial No. 203,625. (No model.)

*To all whom it may concern:*

Be it known that I, DAVID A. FRICK, a citizen of the United States, residing at Ottawa, in the county of Putnam and State of Ohio, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to nut-locks, and more particularly to that class of nut-locks which is applicable to securing nuts in place on bolts which are employed for holding fish-plates and angle-plates in place in railway construction and maintenance.

The object of my invention is to furnish a cheap, simple, and durable nut-lock in which the nut may be set up as tightly as may be desired and there secured against backturning by means which are readily detachable, which may be used as frequently as may be desired, and in which the parts may be adjusted in relation to each other without taking the whole device apart. I attain these objects by means of the devices and arrangement of parts hereinafter described and shown, and illustrated in the accompanying drawings, in which—

Figure 1:
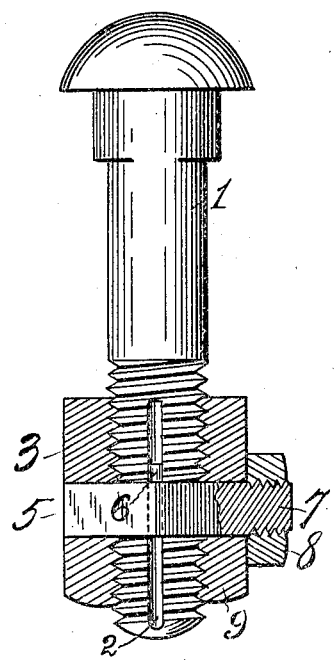
Figure 2:
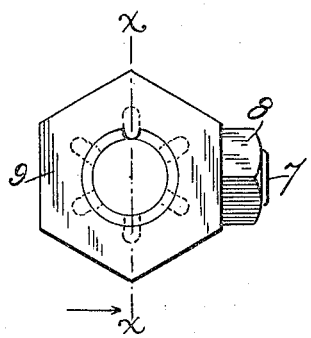
Figure 4:
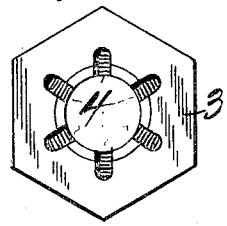
Figure 3:
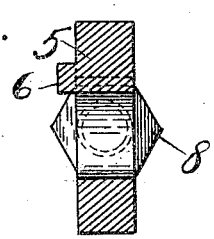

Figure 1 is a side elevation of a bolt carrying a nut secured by my locking device, which is shown in section; Fig. 2, an end view of the same; Fig. 3, a transverse sectional elevation of the washer hereinafter referred to, and Fig. 4 an outside end elevation of the nut hereinafter referred to.

Like numerals of reference indicate like parts throughout the drawings.

In the drawings, 1 is a threaded bolt, the threaded portion of which is provided with a longitudinal groove 2.

3 is a nut of ordinary construction, save that one of the faces of the nut is provided with a series of equidistant radial recesses 4.

5 is a washer having on one of its faces a lug 6, adapted to fit into the groove 2 and into either one of the radial recesses 4 in the adjoining face of the nut 3. The washer 5 is provided with an integral cylindrical lug 7, threaded as a screw, upon which is a small safety-nut 8.

9 is a jam-nut, between which and the nut proper, 3, the washer 5 is interposed.

The operation of my device is as follows: The bolt 1 being in place, the nut 3 is screwed onto the thread of the bolt the desired distance, with the recesses 4 turned outwardly. The unthreaded washer 5 is now slipped onto the projecting end of the bolt, with the lug 6 engaged with the groove 2 and one of the recesses 4. If this nut and washer are of hexagonal form, the angular faces of the nut and the washer will now coincide. The jam-nut is next screwed into place. The safety-nut 8 is now screwed tightly onto the threaded lug 7, the inner face of the safety-nut overlapping the nut 3 and the jam-nut 9. Since the washer by means of the spline and groove 2 6 is prevented from turning, it will be seen that the nut and the jam-nut are rigidly and immovably secured against displacement.

Having described my invention, what I claim, and desire to secure by Letters Patent, is—

A screw-bolt having its threaded portion grooved longitudinally, a nut having in its outer side a series of equidistant radial recesses, a washer having on its inner side a lug adapted to engage either of said recesses and said longitudinal groove, a radially-projecting threaded lug upon said washer, a jam-nut, and a nut for said threaded lug which overlaps the first-mentioned nut and the jam-nut.

In testimony whereof I affix my signature in presence of two witnesses.

DAVID A. FRICK.

Witnesses:
W. W. SUTTON,
GEORGE FRITZ.